United States Patent [19]

Ryan

[11] Patent Number: 4,688,480
[45] Date of Patent: Aug. 25, 1987

[54] AGRICULTURAL FEED BAGGER

[75] Inventor: Kelly P. Ryan, Blair, Nebr.

[73] Assignee: Ryco Enterprises Incorporated, Blair, Nebr.

[21] Appl. No.: 809,287

[22] Filed: Dec. 16, 1985

[51] Int. Cl.$^4$ ................................................ B65B 1/10
[52] U.S. Cl. ....................................... 100/144; 141/10; 198/723
[58] Field of Search .............. 56/344, 364; 100/65, 100/100, 144, 177, 188, 189; 141/10, 67, 114; 198/612, 626, 640, 642, 690.2, 698, 723; 222/410, 414; 414/132

[56] References Cited

U.S. PATENT DOCUMENTS

| | | | |
|---|---|---|---|
| 1,745,001 | 1/1930 | Bates | 198/698 X |
| 2,071,495 | 2/1937 | Brunner | 198/640 X |
| 2,778,483 | 1/1957 | Nikkel | 198/723 X |
| 3,083,810 | 4/1963 | Zebarth et al. | 198/698 |
| 3,580,388 | 5/1971 | Resener | 198/690.2 |
| 3,595,289 | 7/1971 | Greiner | 241/83 |
| 3,687,061 | 8/1972 | Eggenmuller et al. | 100/65 |
| 4,067,504 | 1/1978 | Teates | 241/101.7 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |

FOREIGN PATENT DOCUMENTS 2005218  8/1971  Fed. Rep. of Germany .

OTHER PUBLICATIONS

"Eberhardt Silopresse 401 Ersatzteilliste Spare Parts List", published Jun. 1975.

*Primary Examiner*—Stephen Marcus
*Assistant Examiner*—Mark Thronson
*Attorney, Agent, or Firm*—Wood, Dalton, Phillips, Mason & Rowe

[57] ABSTRACT

Improvements in apparatus for loading feed stock into agricultural bags. One aspect of the invention is the provision of a pusher plate between adjacent teeth on a rotor that propels the feed stock to enlarge the effective surface area for moving the feed stock. Another aspect of the invention is the provision of a brake disk on a shaft associated with spaced cable feeding drums that are yieldably braked to control the expansion of the bag. The disk is located between the drums and is associated with a coupling that interconnects the shaft when it is formed in other than one piece. A further aspect of the invention is the provision of a master cylinder to control the yieldable braking force on the cable carrying drums. A further aspect of the invention is the provision of a frame structure having associated hooks to guide winding of a line to form a backstop wall. A still further aspect of the invention is the provision of a tensioning apparatus comprising an arm that is pivotally biased against a flexible drive member and one that has a guide surface which bears against the drive member.

8 Claims, 13 Drawing Figures

AGRICULTURAL FEED BAGGER

DESCRIPTION

1. Technical Field

This invention relates to apparatus for loading compressible, agricultural feed stock into expandable storage bags.

2. Background of the Invention

Horizontally expandable, silage storage bags are commonly used as an alternative to permanent feed storage structures such as barns and silos. From an economic standpoint, the expandable storage bag is preferable to more elaborate, permanent structure. Further, the expandable bags are more easily loaded than permanent structure and the silage stored therein is readily accessible for use.

An exemplary prior art structure is disclosed in Reissue U.S. Pat. No. 31,810, to Lee. A tractor-powered loading apparatus is disclosed in association with an expandable bag. A backstop is located at the filled end of the bag and has attached thereto laterally spaced cables which extend back to rotatable cable drums. The drums are yieldably braked and, under a predetermined force applied to the cables, release the cable to allow movement of the loading apparatus and tractor away from the filled end of the bag. The bag is filled by a toothed rotor which propels silage through the bag inlet. By presetting the braking structure to yield at a desired cable tension, an operator can select the degree of compaction of silage in the bag.

There are numerous problems that one contends with using Lee's structure. Lee uses a hydraulic system to operate his drum brake. More particularly, Lee uses a hand pump to build the system up to a desired pressure. This requires oscillation of the pump handle until a desired pressure is realized. From an operating standpoint, this is clearly inconvenient.

Another drawback with Lee's braking structure is that the brake calipers operate on a brake disk that is integral with the drum carrying the cable connecting the backstop. Wear on and/or damage to the brake disk might render the entire drum unuseable.

Further, because a brake disk is provided on only one of the drums in Lee, it may be difficult or impossible to apply an even braking force on both sides of the bag through the cables. The shaft interconnecting the drums tends to twist under the substantial force that is developed by the compacting silage, thereby causing skewing of the loading apparatus as it moves away from the filled end of the bag. The shaft might also be loaded in operation to the point of failure.

Another drawback with the prior art is that rotor structure, such as shown in Lee, are inefficient. In conventional apparatus, a rotor body carries a plurality of axially spaced blades. The planes of the blades run parallel to the direction of rotation of the rotor. Consequently, only the leading edges of the blades engage and propel the silage. To effectively move the silage the teeth must be placed close together. This requires the provision of a substantial number of teeth, which adds to the weight and cost of manufacturing the rotor. Even with the teeth closely spaced, with silage that is dry and fine, movement of the silage through the rotor may be ineffective.

SUMMARY OF THE INVENTION

The present invention is specifically directed to overcoming the above enumerated problems in a novel and simple manner.

In one aspect of the invention, a modification is made to a conventional-type rotor, to enhance its silage conveying ability. A pusher plate is provided between adjacent rotor teeth and defines a pushing surface extending radially outwardly from the body of the rotor. Accordingly, the surface area contacting the silage as the rotor rotates is substantially increased, accounting for more efficient conveyance of the silage. This permits a reduction in the number of teeth required on the rotor, thereby reducing overall rotor weight and the cost of manufacture thereof.

Another aspect of the invention is the provision of a braking structure on the shaft between cable drums. A brake disk is mounted on the shaft between and separate from both drums. An even braking pressure can be applied simultaneously to both drums. The shaft can also be formed in two parts. In a further refinement of the invention, the brake disk is associated with a coupling that interconnects the shaft parts between the drums. This facilitates assembly, repair and/or replacement of the shaft and/or brake disk.

A still further aspect of the invention is the provision of a structure for operating the braking mechanism for the drum that conventionally requires only the setting of a desired braking pressure. In a preferred form, a master cylinder, such as that incorporated into automobiles, is mounted on the loading apparatus for operation of one or more brake calipers cooperating with the brake disk. A manually operable lever controls a piston in the master cylinder and is movable as desired to automatically choose a desired brake pressure and in turn the degree of compaction of the silage.

The present invention is also concerned with a simplified backstop structure against which silage is directed in filling the agricultural bag and a method of forming the backstop. With the inventive structure, an enclosed frame is defined and has a plurality of open hooks. A single length of flexible line can be wound around the hooks to define a first plurality of parallel line rows and a second plurality of parallel line rows extending transversely to the first plurality of line rows. The first and second plurality of rows are preferably interwoven to rigidify the backstop.

The present invention is further concerned with a take-up apparatus normally used to tension a drive belt or chain. Typically, the rotor is operated through a power take-off on a tractor or the like. A chain is used to transmit rotative motion from the power take-off to the rotor. It is desirable to have a take-up apparatus to control tension on the chain to eliminate slack after assembly of the chain. A pivotable control arm is mounted on a fixed support and has a guide surface to engage the flexible drive member, be it a chain or belt. A slider is provided and is interconnected to the control arm in such a manner that as it translates in a first direction, the control arm is borne against the drive member to increase the tension thereof. The slider is normally biased with a predetermined force in the first direction to take up slack in the flexible drive member.

DESCRIPTION OF THE PREFERRED EMBODIMENT

Figure 1:
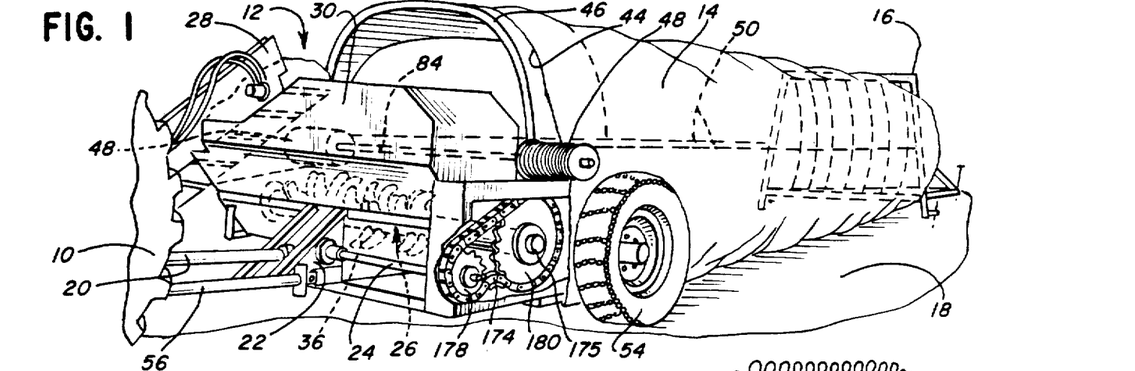
FIG. 1 is a perspective view of a bag loading apparatus with an agricultural bag in operative position thereon and incorporating a preferred form of the present invention.
Figure 2:
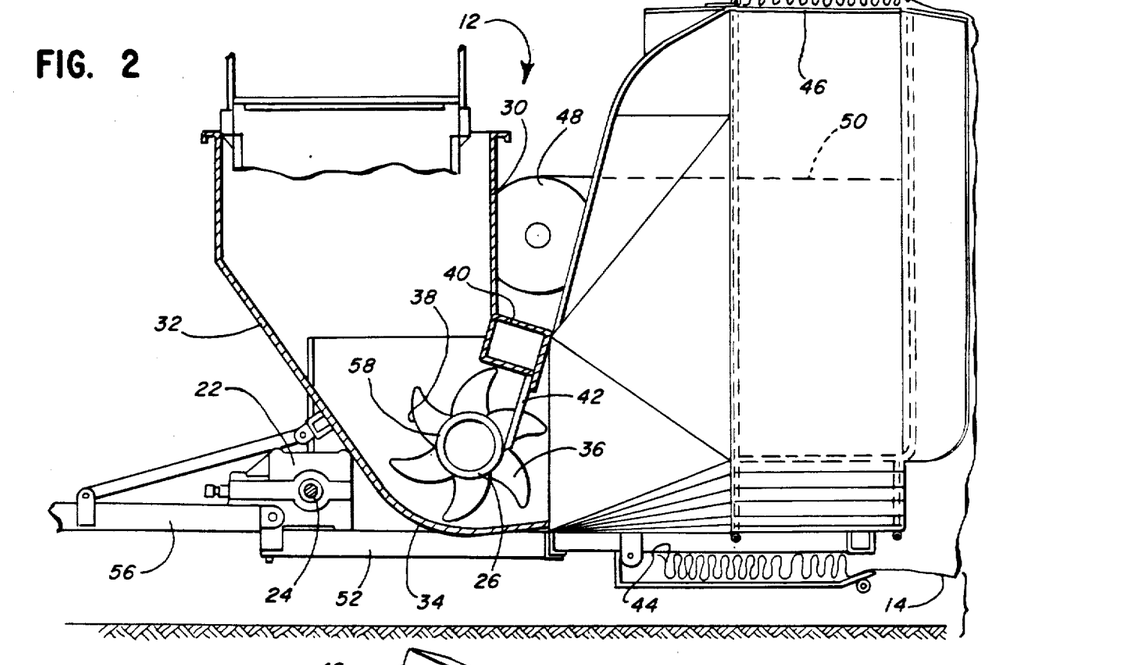
FIG. 2 is a side, partial cross-sectional, elevation view of the bag loading apparatus of FIG. 1.
Figure 3:
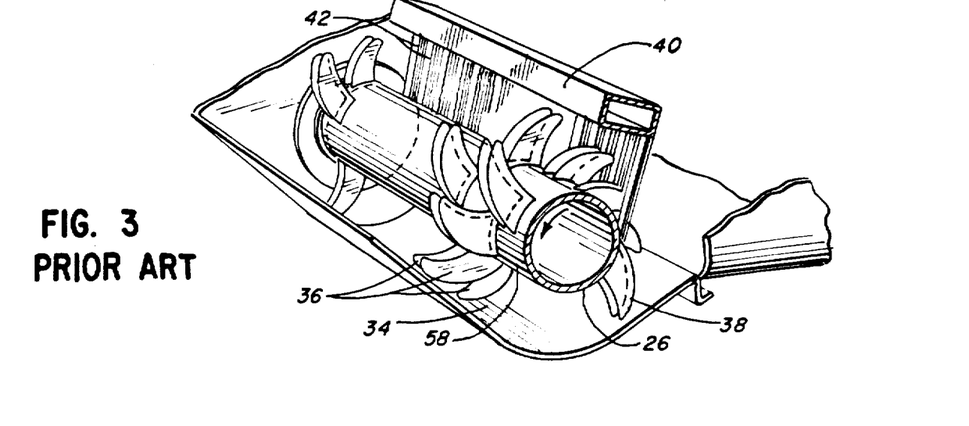
FIG. 3 is an enlarged, fragmentary view of a prior art hopper and associated rotor for advancing feed stock into the agricultural bag.

A typical feed stock compacting and loading system that is suitable for incorporation of the present invention is shown in FIGS. 1-3. The system comprises a drawing vehicle such as a tractor 10, a bag feeding section at 12 and a silage receptacle or bag 14 that bears at one end against a backstop 16 staked and supported by props on the ground 18. The tractor 10 has a power takeoff 20 that, through an intermediate gear box 22, imparts rotative movement to a laterally extending shaft 24 which is in turn geared to a toothed rotor at 26.

In operation, feed stock such as corn, hay, alfalfa and the like is fed from a self-contained conveyor 28 to a hopper 30 in the feeding section 12 and is delivered gravitationally to the toothed rotor 26 at the bottom of a housing 32 having a curved bottom wall 34, which wall 34 supports and guides incoming feed stock towards the rotor. The rotor has welded thereto a plurality of conveying teeth 36. Each tooth 36 has a convex leading edge 38. A laterally extending beam 40 above the rotor 26 has fixed thereto in depending fashion laterally spaced cleanout bars 42. The teeth 36 propel the feed stock and thereafter sweep past the bars to clean any clinging feed stock off the teeth of the rotor. The feed stock picked up by the rotor teeth is propelled through the bag inlet 44, which fits telescopingly over a feed tunnel 46 on the feeding section 12. The silage bag 14 is normally collapsed in accordian-like manner over the tunnel 46 as the filling is initiated as clearly shown in FIG. 2. Laterally spaced feed drums 48 are attached to the feeding mechanism on the feeding section 12 and each is wound with a supply of cable 50. The free end of each cable 50 extends to the backstop 16 and is attached fixedly thereto. Yieldable braking structure, as will be described in detail hereafter, is associated with the drums to allow rotation thereof under predetermined tension applied to the cables. The feed drums are supported with the remainder of the feeding section 12 atop a frame or chassis 52, which is mobilized by wheels 54 (one shown).

In operation, the feed stock is delivered through the hopper 30, intercepted by the rotor 26 and propelled through the bag inlet 44 and against the backstop 16. As the feedstock accumulates, the tension on the cables 50 increases. Once the cable tension reaches a predetermined value, the drum will rotate to release the cable and, as this occurs the chassis 52 shifts away from the backstop and the filled end of the bag. The chassis movement is transmitted to the tractor through a rigid tongue 56. By controlling the brake pressure on the drums, the degree of compaction of the silage in the bag before movement of the chassis occurs can be selected.

One aspect of the invention is an improvement in the rotor section, as detailed in FIGS. 2-6. In the prior art apparatus of FIG. 2, the teeth 36 are arranged in pairs around the periphery of a cylindrical body 58 and attached thereto as by welding. A typical spacing between adjacent teeth is 1¼"-2". Alternating teeth pairs are aligned in rows along the axial length of the body. The rows are staggered axially, one from the other, so that each tooth pair in a row resides axially between adjacent tooth pairs on adjacent rows. To prevent feed stock from squeezing between the teeth in any pair in the prior art apparatus, the teeth are kept close together. Typicallly the spacing between teeth in conventional apparatus is less than ⅜".

Figure 4:
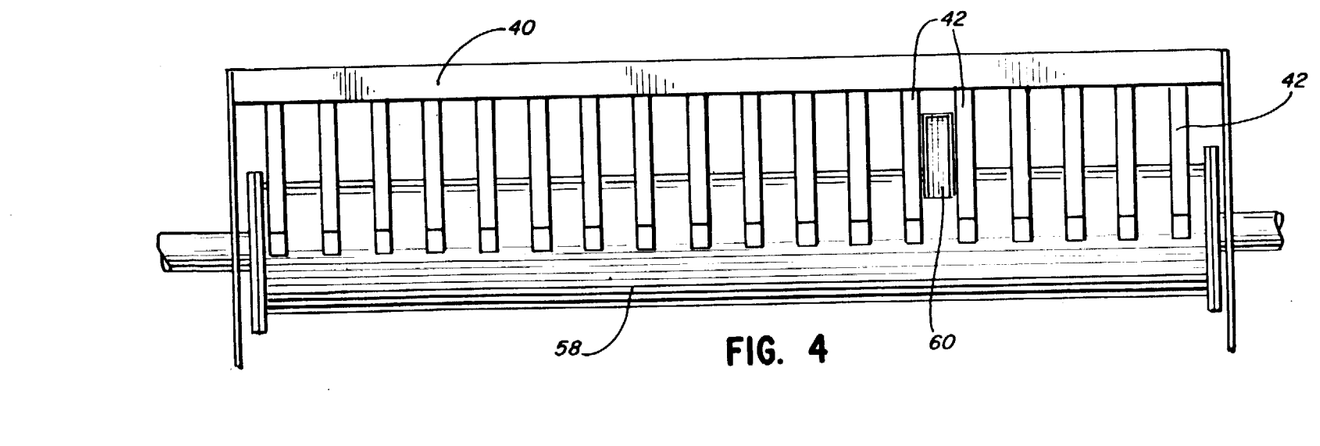
FIG. 4 is an end elevation view of the rotor with the invention incorporated into two adjacent rotor teeth.
Figure 5:
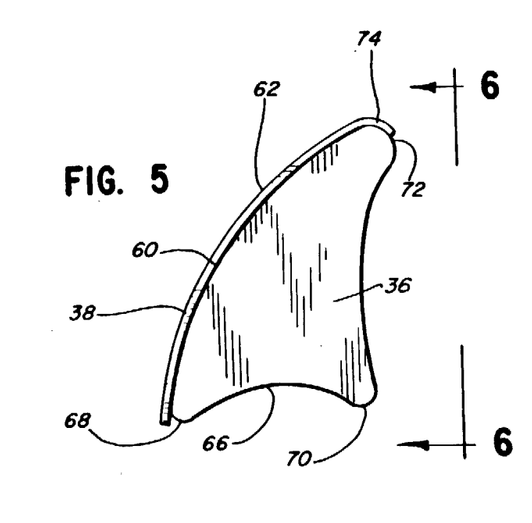
FIG. 5 is a side elevation view of one of the teeth on the rotor having the invention incorporation therein.

According to the invention, as detailed in FIGS. 3-5, a pusher plate 60 is provided between the teeth of preferably each pair of teeth. The pusher plate projects radially outwardly from the body to define a pushing surface 62 that is substantially greater than the pushing surface defined by the leading edges 38 of the teeth. The pusher plate 60 can be connected directly to the body and/or may be attached to the curved, leading edges 38 of the teeth 36 in each tooth pair.

Figure 6:
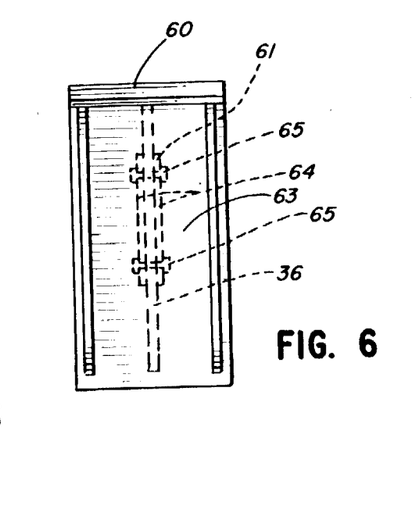
FIG. 6 is an end elevation view of the teeth along line 6—6 of FIG. 5.

In a preferred form, the teeth 36 each have a bottom edge 66 that is curved to conform to the body 58 and welded thereto. The teeth each have an overall triangular configuration, with each of the apexes 68, 70, 72 rounded to prevent hangup of material thereon. The plate itself is preferably ¼" thick and is curved to the contour of the leading edge and has a radially outer end 74 that is bent down to conform to the upper apex 72 so that there will be no tendency of the feed stock to hang up on the outer end as the teeth sweep through the feed stock. The bend in the outer end 74 is not necessary however. Alternatively the end 74 can be cut off squarely and preferably has a radial extent at least equal to that of the tooth or teeth with which it is associated. As seen in FIG. 6, preferably, the plate extends slightly, laterally beyond each of the teeth 36 of the tooth pair.

While the mounting of the pusher plates to teeth pairs is preferred in that it gives good side thrust support, the invention also contemplates mounting of the pusher plate on but a single tooth 36 as shown in phantom in FIG. 6. For greatest stability, the plate 36 is preferably located in laterally centered relationship with respect to the pusher plate 60. The relationship between the tooth 36 and pusher plate 60 is otherwise the same as the previously described embodiment.

A further refinement of the invention is the provision of structure for removably mounting the pusher plate 60 to the teeth 36, which structure is also shown in FIG. 6 in phantom. A U-shaped channel 61 having a web curved to the contour of the inside surface 63 of the pusher plate is attached, as by welding, to the pusher plate. The spaced channel legs 64 closely bound the tooth 36. With the pusher plate in place, bolts 65 can be directed through the channel legs 64 and tooth to secure the connection therebetween. If the pusher plate wears after prolonged use, it can be easily replaced.

The relationship between an exemplary tooth pair with the inventive pusher plate and the clean-out bars 42 is demonstrated in FIG. 4. Each clean-out bar is preferably constructed from 1" square, solid material spaced on the order of 3¼" centers. The pusher plate is constructed preferably from ¼" stock and is preferably from 1¼" to in excess of 2" in width to pass freely between the clean-out bars as shown in FIG. 4. The teeth can therefore be spaced approximately to the width of the pusher plate thereby more than doubling the conventional spacing between teeth. With the described arrangement, the teeth bear on the pusher plate during operation to more positively and efficiently propel and pack the feed stock in the bag.

Figures 7, 8, 9:
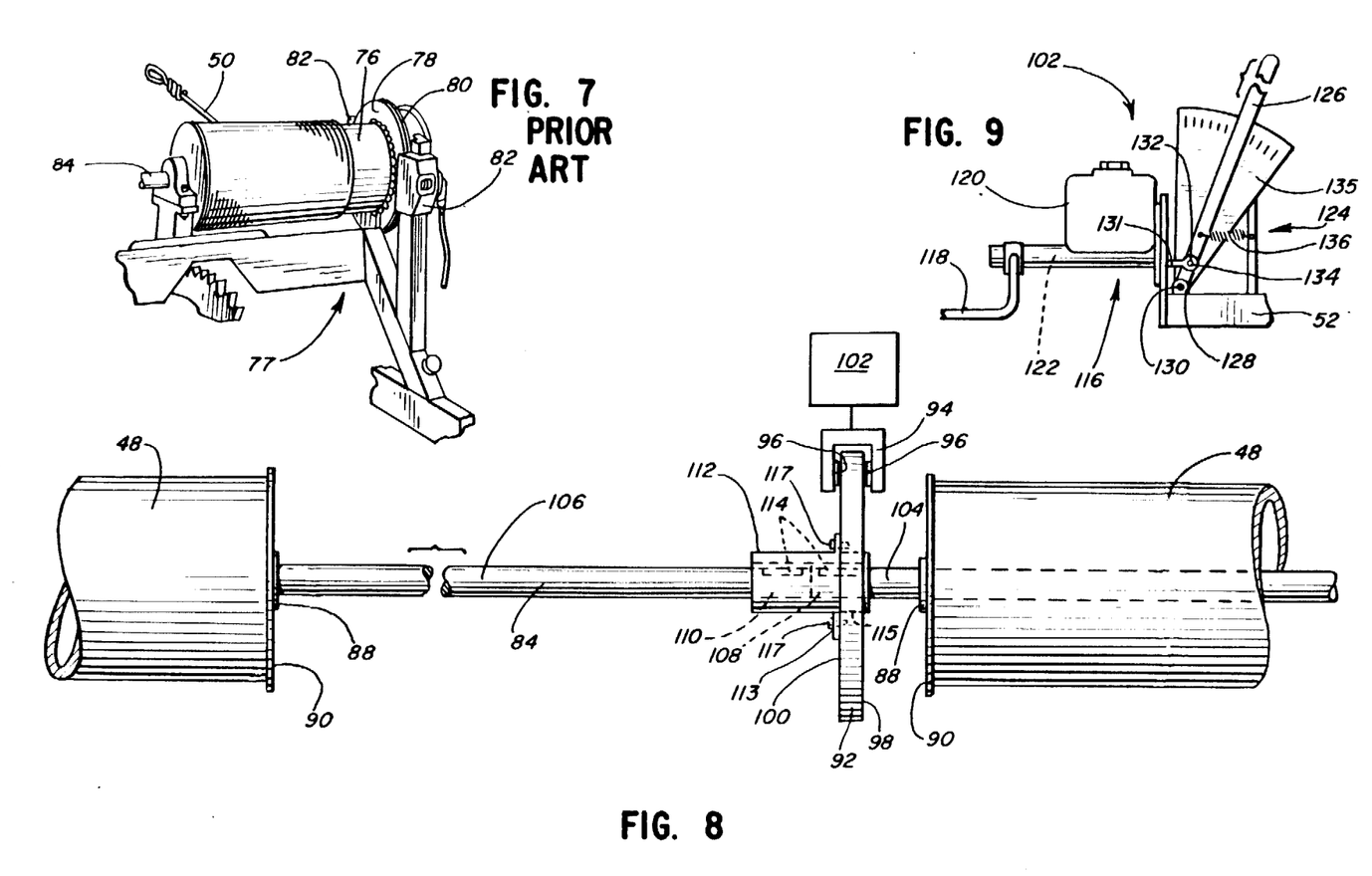
FIG. 7 is a perspective view of a prior art cable drum with a conventional braking system for controlling extension of the bag.
FIG. 8 is an elevation view of a braking system for cable carrying drums according to the present invention.
FIG. 9 is an elevation view of a control system for yieldably braking the cable carrying drums of FIG. 8.

Another aspect of the invention is the provision of improved structure for yieldably braking the cable carrying drums 48, shown in FIGS. 1, 7 and 8. FIG. 7 depicts a prior art drum braking mechanism over which the present invention improves. In the prior art structure of FIG. 6, the drum 76, upon which cable 50 is wound, is supported for rotation on a frame at 77 carried by the chassis 52 in conventional manner. The drum 76 has an integrally formed flange 78 defining the brake disk 80. Only one drum of the pair of drums is braked in the prior art structure. To accomplish the braking, calipers 82 are provided and are hydraulically actuated to bear on the brake disk 80. In the event that the brake disk wears out, the entire drum might be rendered unuseable. Further, braking from one side puts a substantial torque on the shaft 84 interconnecting the drums, which thereby rotate as a unit, and might cause shaft twisting that the end results in one cable being longer than the other and skewing of the bag as it is filled. The result is an incomplete filling of the bag.

The improved structure in FIG. 8 is shown without a cable supply on the laterally spaced drums 48. The drums 48 are interconnected by shaft 84, which extends entirely through the drums 48. The shafts have associated flanges 88 which facially abut facing side plates 90 on each drum and are secured thereto as by bolting or welding.

According to the invention, a brake disk 92 is mounted on the shaft 84 between the spaced drums 48 and is separate therefrom. The brake disk 92 is operated on by one or more U-shaped calipers 94 having associated pads 96 bearing frictionally against the oppositely facing brake surfaces 98, 100 on the brake disk. The calipers 94 are controlled by an actuator 102, as will be described in detail hereafter. With the described arrangement, braking occurs on the shaft between the drums and therefore applies an even pressure to both drums 48 and minimizes twisting of the shaft 84 as might cause uneven braking on the drums.

In a preferred form, the shaft 84 is formed in two joinable parts 104, 106. The ends 108, 110 of the shaft parts 104, 106 respectively, are extended oppositely through a sleeve-shaped coupling 112 and are fixed against rotation relative thereto by key members 114. The brake disk 92 surrounds and is preferably removably secured to the coupling 112. To accomplish this removable connection, a flange plate 113 is integrally formed with the coupling 112. The coupling 112 is extended from left to right in FIG. 8 through a bore 115 in the brake disk until the brake surface 100 seats facially against the flange plate 113. A plurality of bolts 117 secure the connection between the flange plate and the brake disk. By providing separate shaft parts, assembly of the drums is facilitated and further assembly and removal of the brake disk 92 for repair and/or refurbishment is simplified. By moving the shaft parts axially oppositely to disengage the coupling, the coupling and brake disk can be separated.

The removable connection of the brake disk is particularly desirable because this feature facilitates its manufacture. The brake disk is preferably hard chrome plated to give smooth performance and minimize rust. The plating process is expensive. By permitting separation of the brake disk, the coupling and flange plate do not impair the plating process and need not be plated themselves. This reduces the cost of and simplifies manufacture of the brake disk.

Another aspect of the invention is the provision of an improved actuator 102 for operating the yieldable braking structure associated with the drums 48 of FIG. 8. In the improved actuator structure in FIG. 9, a master cylinder at 116, such as ones conventionally used in automobiles, is mounted on the chassis 52 and selectively controls hydraulic fluid pressure through an outlet line 118, to control the brake caliper 94. Briefly, the master cylinder 116 comprises an oil reservoir 120 in communication with a pressure chamber 122 within which a control piston (not shown) operates. The control piston is movable axially with respect to the pressure chamber 122. Shifting of the piston increases the pressure in the outlet line 118 to increase the braking force and therefore the tension required on the cables before the brake drums rotate.

To control the piston, an operating mechanism at 124 is provided on the chassis 52. A lever arm 126 has one end pivotally attached to a tab 128 on the chassis 52 through a pivot pin 130. An actuator link, 131 is attached to the master cylinder piston and has a free end 132 pivotally attached through a pivot pin 134 to an intermediate position on the lever arm 126. Pivoting of the lever arm 126 translates the piston in a fore and aft direction to control the hydraulic pressure on the braking mechanism.

It should be understood that the foregoing structure is only exemplary of a control for the master cylinder. For example, a threaded member might be used to translate the piston in the fore and aft direction to control hydraulic pressure.

To choose a desired yield pressure, a pie-shaped gauge 135 is mounted on the chassis and has graduations thereon corresponding to different braking pressures. A spring 136 attached to the lever arm 126 and chassis 52, biases the lever arm 126 towards a no-brake condition to prevent inadvertent application of braking pressure on the drums. As an alternative to the gauge 135, a conventional pressure gauge might be placed in the hydraulic lines to give a pressure reading.

With the above described arrangement, it is possible to simply set a desired braking pressure. The system will automatically self-adjust to the preselected pressure value. With the prior art mechanism discussed above, one must manually and progressively pump up to a desired pressure, which is time consuming and inconvenient.

The invention also contemplates the provision of an improved backstop structure and method of forming the same. A preferred form of the backstop is shown generally at 138 in FIG. 10, with hardware therefor shown in FIGS. 11 and 12. The backstop 138 comprises an enclosed frame 139 consisting of spaced, vertical, side frame pair 140, 142 and spaced, horizontal, frame pair 144, 146. Between the vertical sides and the upper horizontal side 146 are diagonal frame members 148, 150. The two frame pairs 140, 142 and 144, 146 and diagonal frame members 148, 150 cooperatively bound an enclosed space. The frame members are preferably made of metal channel welded into the described configuration.

Figures 10, 11, 12:
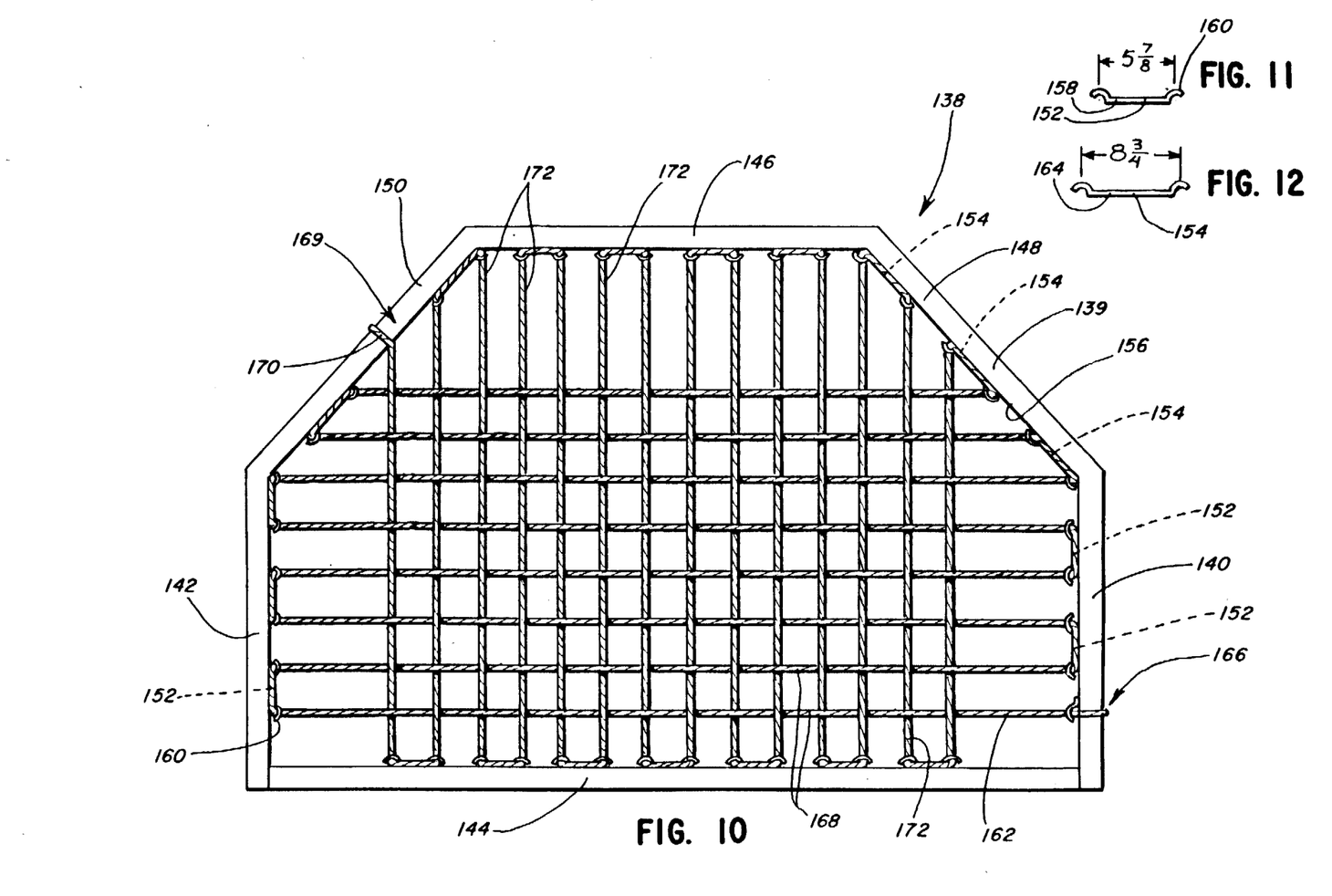
FIG. 10 is an end elevation view of a backstop for the agricultural bag according to the present invention.
FIG. 11 is an elevation view of one of the hook members for guiding a line that is woven to form the backstop in FIG. 10.
FIG. 12 is a hook similar to that in FIG. 11.

To facilitate formation of the backstop wall, a plurality of hook members 152, 154 are provided on the inside peripheral edge 156 of the frame. Each hook member 152 comprises an elongate body 158 having turned, hooked ends 160 for grasping a line 162 that is woven within the frame as described hereinafter. The hook member 154 is identical in construction to the hook 152 with the exception that its body 164 is longer. The hooked members 152, 154 are preferably formed from a metal rod. The shorter hooks are attached to the vertical and horizontal sides, while the longer hook members are attached to the diagonal sides to match the horizontal spacing determined by the hooks on the bottom side 144.

To form the backstop, an end of the line 162, such as wire or heavy cord, is cinched around one of the vertical sides, and in FIG. 10 side 140 at 166. Alternatively a hook such as on the hook members 152, 154 can be provided on the frame to secure the line end. The line is directed across the width of the frame and around the bottom hooked end 160 of the hook member 152, across the body 158, over the top hooked end 160 and back across widthwise to the hook on the other upright side 140 in similar fashion following the direction of the arrows in FIG. 10. This pattern continues until the first longer hook member 154 is encountered on diagonal frame member 148. At this point, a plurality of horizontal, parallel line rows 168 are defined.

Upon encountering the larger hooked member 154, the rows change to be vertically directed and the wrapping pattern continues in the same manner as forming the horizontal rows until the free end 170 of the line arrives at a space at 169 on frame member 150 at which point the free end is cinched. A hook can also be provided at the frame space 169 to secure the free line end 170. A plurality of parallel, vertically extending line rows 172 are thereby formed. Preferably, as the vertical rows of line are formed, the line is alternatingly passed to one side and then the other of the horizontal line rows to effect a weaving pattern. The resulting structure is inexpensive, easy to construct and has good integrity.

Figure 13:
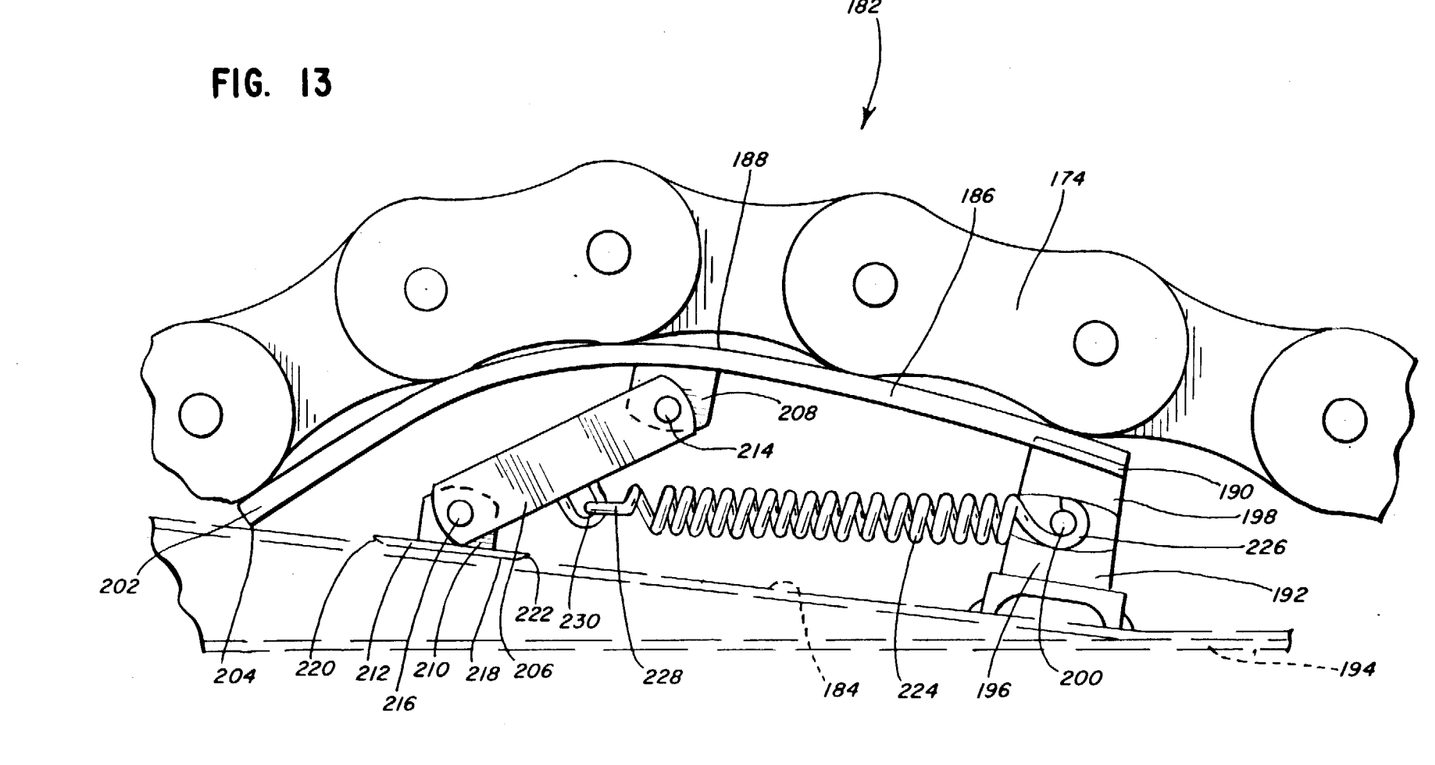
FIG. 13 is an enlarged, side elevation view of tensioning structure according to the present invention on a portion of drive chain associated with the feeding structure of the apparatus in FIG. 1.

The invention is also concerned with a pick-up device for eliminating slack in a drive chain, such as the drive chain 174 used to transmit motion between shaft 24 driven by the power take-off and the rotor shaft 175 as seen in FIGS. 1 and 13. A sprocket 178 is secured to the end of the shaft 24 while a sprocket 180 is secured rigidly to the end of the rotor shaft 175.

The tensioning structure is shown generally at 182 in FIG. 13. The structure 182 is functional to take up slack in any flexible drive member, be it a chain or a belt, as long as there is a flat surface such as the surface 184 close to the plane of the line of travel of the drive member 174. The surface 184 can be, for example, a surface on the top of an oil reservoir on the apparatus in FIG. 1.

The tensioning structure 182 comprises a curved control arm 186 with a curved surface 188 over which the chain 174 is guided. One end 190 of the control arm 186 is pivotally attached to a base 192 that is welded to the support 194 having the flat surface 184. The base 192 has a flat, upright wall 196 which is surroundingly engaged by two parallel walls 198 (one shown) depending from the end 190 of the control arm. A pivot pin 200 extends through the upright wall 196 of the base 192 and penetrates the spaced walls 198 and guides pivoting of the actuating arm around the axis of the pin 200. The free end 202 of the control arm 186 has a corner 204 that abuts the flat surface 184 to limit pivoting of the control arm.

A pivot link 206 interconnects a tab 208 on the control arm with an upright tab 210 on a slider 212. The connection of the pivot link 206 with the tabs 208 and 210 is accomplished through pivot pins 214 and 216 respectively, so that the pivot axes of the pivots 214, 216 are parallel to the pivot axis of pin 200. The slider 212 has a flat bottom surface 218 which translates freely over the guide surface 184 towards and away from the base 192. The free edges 220, 222 of the slider 212 are bevelled to prevent any hang-up as the slider translates guidingly against the surface 184.

The link 206 is normally biased by a coil spring 224 towards the base. The coil spring has one end 226 surrounding the pivot pin 200, while its other end 228 engages a hook 230 welded to the link 206. As the pivot link and the slider are drawn towards the base 192, the pivot link tends towards a vertical orientation in FIG. 13 and urges the control arm in a first pivot direction outwardly against the chain 172 to increase the tension thereon. The degree of tension exerted by the structure 182 is determined by the characteristics of the coil spring 224.

The foregoing description is made for purposes of demonstrating the structure and operation of the invention, with no unnecessary limitations to be understood therefrom.

I claim:

1. In an apparatus for loading feed stock into an agricultural bag having an inlet for introduction of the feed stock, said apparatus having a rotor with a rigid, generally cylindrical body having a rotational axis, a plurality of teeth fixedly attached directly to the rotor body and having a width in the axial direction of the rotor body, said teeth picking up and propelling feed stock generally radially with respect to the rotor body through the bag inlet as the rotor is operated, the improvement comprising:

pusher means having a pushing surface with a width greater than the width of the teeth and extending radially outwardly with respect to the axis of the rotor body; and means for attaching the pusher means to at least one of the rotor and one of the teeth, so that the pusher means rotates with the rotor, said pushing surface enlarging the contact area of the one tooth with the feed stock as the rotor rotates to enhance movement of the feed stock toward the bag inlet.

2. The improved feed stock loading apparatus of claim 1 wherein the means for attaching the pusher means removably attaches the pusher means to at least one of the rotor and one of the teeth so that the pusher means can be replaced once it is worn.

3. In an apparatus for loading feed stock into an agricultural bag having an inlet for introduction of the feed stock, said apparatus having a rotor with a rigid generally cylindrical body having a rotational axis, a plurality of teeth fixedly attached directly to the rotor body for picking up and propelling feed stock generally radially with respect to the rotor body through the bag inlet, there being first and second teeth spaced axially with respect to the rotor axis, the improvement comprising:

pusher means between the first and second teeth extending radially outwardly from the body and defining a pushing surface, said pushing surface enlarging the contact area of the first and second teeth with the feed stock as the rotor rotates to enhance movement of the feed stock toward the bag inlet.

4. The improved feed stock loading apparatus of claim 3 including first and second clean out bars and means mounting the clean out bars in axially spaced relationship with respect to the rotor, said first and second teeth and the pushing surface being movable between the first and second clean out bars as the rotor operates.

5. The improved feed stock loading apparatus of claim 3 wherein said first and second teeth have substantially the same configuration, each of the first and second teeth has a curved leading edge and said pusher means comprise a plate attached to the leading edges of both the first and second teeth so that the pushing surface has a convex configuration.

6. The improved feed stock loading apparatus of claim 3 wherein the spacing between the first and second teeth is between $1\frac{1}{4}''-2''$.

7. In an apparatus for loading feed stock into an agricultural bag having an inlet for introduction of the feed stock, said apparatus having a rotor with a rigid, substantially cylindrical body having a rotational axis, a plurality of teeth fixedly attached directly to the rotor body for picking up and propelling feed stock generally radially of the rotor body through the bag inlet as the rotor is operated, there being first and second teeth integral with the rotor body and spaced axially with respect to the rotor axis, the improvement comprising:

means extending between the first and second spaced teeth, extending radially outwardly from the body and defining a pushing surface; and means connecting the pusher means to each of the first and second teeth, said pushing surface enlarging the contact area of the first and second teeth with the feed stock as the rotor rotates to enhance movement of the feed stock toward the bag inlet.

8. The improved feed stock loading apparatus of claim 7 wherein each of said first and second teeth has a leading edge, said pusher means comprises a plate and the means connecting the pusher means connects the plate to the leading edge of each of the first and second teeth.

* * * * *

Disclaimer and Dedication 4,688,480.—*Kelly P. Ryan*, Blair, Nebr. AGRICULTURAL FEED BAGGER. Patent dated Aug. 25, 1987. Disclaimer and Dedication filed Apr. 24, 1989 by the assignee, Kelly Ryan Equipment Co.

Hereby disclaims and dedicates to the Public claim 1 of said patent.

[*Official Gazette June 27, 1989*]